United States Patent
Khan et al.

(10) Patent No.: US 11,563,830 B2
(45) Date of Patent: Jan. 24, 2023

(54) METHOD AND SYSTEM FOR PROCESSING NETWORK PACKETS

(71) Applicant: Nokia Technologies Oy, Espoo (FI)

(72) Inventors: Yusuf Khan, Bangalore (IN); Amal Pillai, Bangalore (IN); Faizan Khan, Bangalore (IN)

(73) Assignee: Nokia Technologies Oy, Espoo (FI)

(*) Notice: Subject to any disclaimer, the term of this patent is extended or adjusted under 35 U.S.C. 154(b) by 322 days.

(21) Appl. No.: 16/715,200

(22) Filed: Dec. 16, 2019

(65) Prior Publication Data

US 2020/0204657 A1 Jun. 25, 2020

(30) Foreign Application Priority Data

Dec. 19, 2018 (IN) .............................. 201811048123

(51) Int. Cl.
*H04L 69/22* (2022.01)
*H04L 45/00* (2022.01)
*G06F 12/0862* (2016.01)
*G06F 13/28* (2006.01)

(52) U.S. Cl.
CPC .......... *H04L 69/22* (2013.01); *G06F 12/0862* (2013.01); *G06F 13/28* (2013.01); *H04L 45/38* (2013.01); *G06F 2212/602* (2013.01)

(58) Field of Classification Search
CPC ... H04N 19/136; H04L 49/9084; H04L 47/32; H04L 47/2441; G06F 3/0655; G06F 3/0623
See application file for complete search history.

(56) References Cited

U.S. PATENT DOCUMENTS

2019/0392546 A1* 12/2019 Flordal ..................... G06T 1/60
2020/0153759 A1* 5/2020 Melman ............. H04L 49/9084
2021/0349656 A1* 11/2021 Adler ..................... G06F 3/0655

* cited by examiner

*Primary Examiner* — Iqbal Zaidi
(74) *Attorney, Agent, or Firm* — Tong, Rea, Bentley & Kim, LLC (57) ABSTRACT

The packet processing system, according to an example embodiment, comprises a Network Interface Controller (NIC) to receive and transmit network packets; a memory unit for storing network packets; a processor for processing network packets stored in the memory unit; a cache unit to access all data to the processor from the memory unit; and an application process running on the processing unit. The NIC includes a packet processing means to process the network packets received by the NIC. The packet processing means includes a Contiguous Header Mapping/Map (CHM) header-data splitter to split said network packets into a header portion and a payload portion; a table or equivalent to store the contiguous header-data split configuration data; and a packet Direct Memory Access (DMA) unit to DMA copy said header portion and said payload portion into separate memory area/location and contiguously map said header portion of network packets in the memory unit.

19 Claims, 6 Drawing Sheets

METHOD AND SYSTEM FOR PROCESSING NETWORK PACKETS

CROSS-REFERENCE TO RELATED APPLICATIONS

This application is based on and claims the benefit of Indian Patent Application No. 201811048123, filed on Dec. 19, 2018, which is hereby incorporated herein by reference in its entirety.

TECHNICAL FIELD

Various example embodiments relate to a method and system for processing of network packets.

BACKGROUND

In the realm of digital communication systems, data is generally transmitted between various communication systems in a network through network packets. Network packets are nothing but small chunks of data or information. These packets carry the data in protocol stacks used in the internet i.e. Transmission Control Protocol/Internet Protocol stack (TCP/IP). A network or data packet typically comprises of three parts, namely; a header, which contains information about the packet, including origin, destination, length and packet number; payload (or body), which contains the data; and a trailer that indicates the end of the packet and frequently include error detection and correction information.

However, the processing of these network packets, especially at high speeds, involves heavy interaction between the internal data structures of the various network elements such as the Network Interface Controller (NIC), memory, the Central Processing Unit (CPU) and the like. In most cases, the network elements access only the packet headers (and not any packet data) to make the forwarding decisions. The payload beyond transport protocol stack is not of any concern to the routers until and unless some sort of Deep Packet Inspection (DPI) is done at the routers. Thus, for an effective processing, it is only the header of the network packet which needs to be processed and not the data of the packet. However, the NIC, in general, on receiving the packets, Direct Memory Access (DMA) copies the entire packet into the memory buffer obtained from Rx ring descriptor. Thus, each packet in memory buffer has both, the protocol header as well as the data, most of which may be not necessary for a data path application. This results in wastage of memory space as a huge amount of the cache is occupied by the payload of the network packet. Thus, storing the entire packet in the buffer not only results in loss of space bit also slows down the processing system. Further, a key challenge in packet processing also exists in the extremely low cycle budget available per packet at high line rates or speed beyond 10 Gigabits per second (Gbps), resulting in huge amount traffic. In most cases, the essential work to be done involves inspecting packet headers or specific fields in the payload to take a decision on further processing actions.

BRIEF SUMMARY

According to an example, the packet processing system comprises a NIC configured to receive and transmit network packets; a memory unit configured to store network packets; a processor configured to process network packets stored in the memory unit; a cache unit which may be a part of the processor or a separate unit to access all data to the processor from the memory unit; and an application process running on the processing unit, typically a user space process or a similar system, wherein said network interface controller includes a packet processing means to process the network packets received by said network interface controller; and wherein said packet processing means includes a Contiguous Header Mapping/Map (CHM) header-data splitter configured to split said network packets into a header portion and a payload portion; a table or equivalent to store the contiguous header—data split configuration data; and a packet DMA unit configured to DMA copy said header portion and said payload portion into separate memory area/location and contiguously map said header portion of said network packets in the memory unit.

BRIEF DESCRIPTION OF THE ACCOMPANYING DRAWINGS

Some example embodiments will now be described with reference to the accompanying drawings.

DETAILED DESCRIPTION

The detailed description set forth below in connection with the appended drawings is intended as a description of various embodiments of the subject matter described herein. Each embodiment described in this disclosure is merely as an example or illustration, and should not necessarily be construed as preferred or advantageous over other embodiments. The word "exemplary" as used herein is to mean "serving as an example", "instance" or "illustration". Any embodiment described herein as "exemplary" is not necessarily to be construed as preferred or advantageous over other embodiments.

Figure 1:
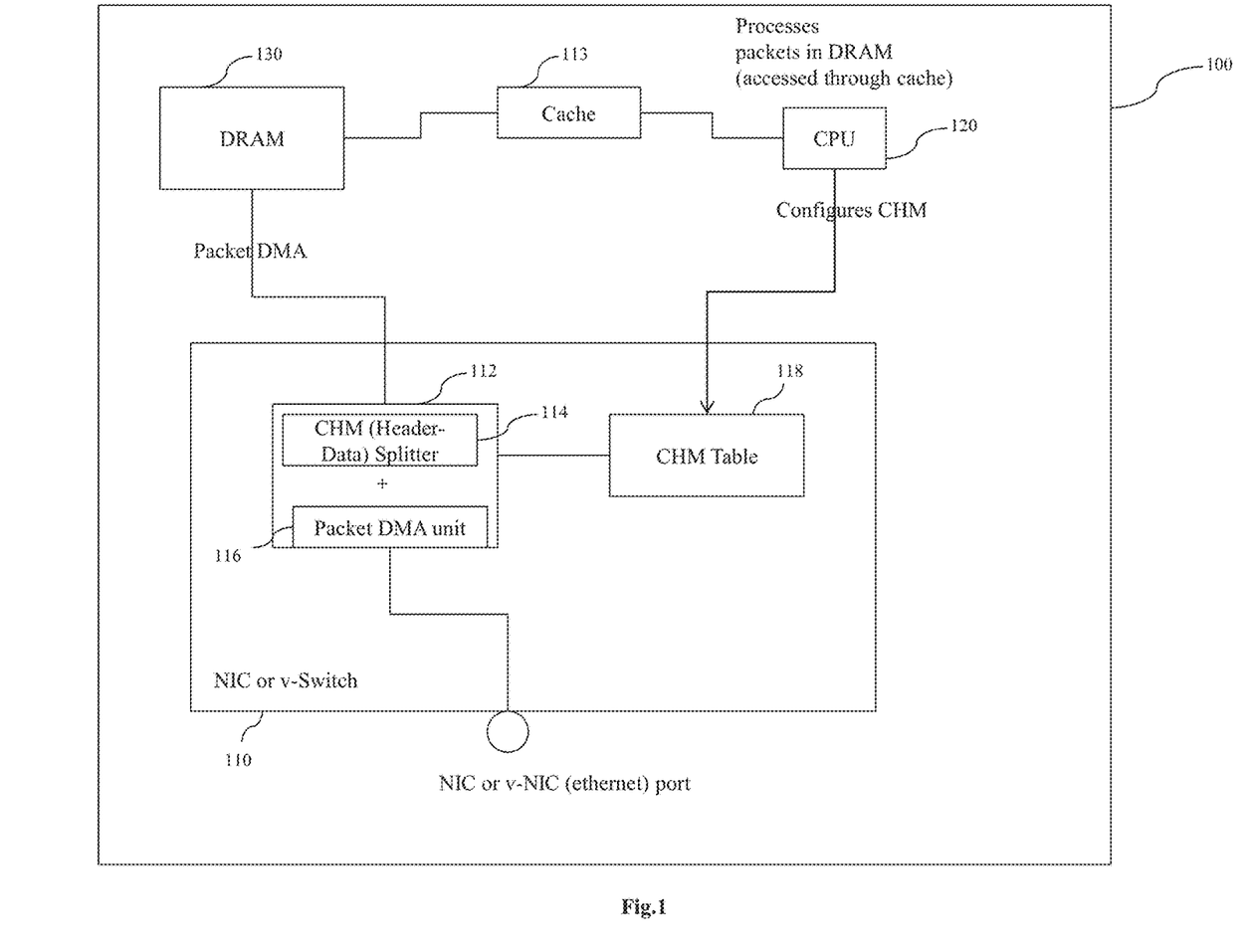
FIG. 1 illustrates an example embodiment of a system to process network packets.

Referring to FIG. 1, the figure illustrates a block diagram of one possible and non-limiting exemplary system (100) capable of receiving, processing and transmitting network packets and through which the exemplary embodiments may be practiced. In an example embodiment as shown in FIG. 1, the packet processing system (100) comprises at least one Network Interface Controller (NIC) (110) that receives network packets, processes the network packets received by the NIC (110) and transmits the processed packet to at least one main memory (130). The at least one main memory (130) stores the network packets which may be accessed by at least one central processor (120) which further processes the network packets stored in the memory (130) for completing the transmission of data in a network.

The at least one central processor (120) may be a Central Processing Unit (CPU) of any computing device capable of processing the packets stored in the memory (130). Network packets stored in the memory (130) may be accessed by the central processor (120) through a cache memory (113). The cache memory (113) may be a separate unit linked to the central processor (120) and memory (130) or a part of the memory (130) itself.

The memory (130) as discussed herein may be memory of any computing device or a separate memory unit capable of storing data such as Direct Random Access Memory (DRAM) or a memory employing similar technology which works with the cache memory (113) of the central processor (120). The memory (130) may optimally work with sequential access of data in a predictable stride pattern. It is to be noted that data in the memory (130) such as DRAM is stored in terms of pages (different and often larger than the Operating System pages of the computing device). For example, the system (100) may assume a 4k DRAM page and a packet header of 64 bytes, such that each row buffer can accommodate 64 packets which improve the performance within the same DRAM page.

The system (100) in an exemplary embodiment can be used in conjunction with traditional slow path data processing, such as the Linux networking kernel using skbuff. The system (100) may also be used in conjunction with fastpath technologies such as Data Plane Development Kit (DPDK) or Vector Packet Processing (VPP) that provide Linux user-space frameworks for packet processing. The system (100) is further configured to route data with and without splitting of the network packets, received by the NIC (110), concurrently and consecutively.

A network packet, in general, comprises of different packet fields, which may further be grouped into different packet segments. The NIC (110) of system (100) is responsible for processing the network packets and contiguously map the said packets into separate memory zones in the memory (130) by splitting the packets into packet segments. In an exemplary embodiment, the NIC (110) of the system (100) further includes one or more processor (112) configured with a computer program code, which together are configured to process the network packets received by the NIC (110). The one or more processor (112) is an apparatus comprising of CHM header data splitter (114) and a packet DMA unit (116).

The packet DMA unit (116) is configured to allow direct memory access to retrieve and transfer the network packets to the memory, such that the processor (112), main memory (130) including a computer programme code, cause the NIC (110) to at least perform the following steps: receiving a network packet including at least one header portion and at least one payload portion, identifying a flow for said network packet based on a set of parameters; determining whether said network packet is to be contiguously mapped by splitting into said at said at least header portion and said at least one payload portion based on said flow; mapping said network packet into a memory (130) based on said flow; and transmitting said network packet with or without splitting.

In an exemplary embodiment, the splitting process and contiguous mapping of the headers of the network packets is carried out by the network controller in the manner as described below:

The CHM Header Data Splitter (114) is configured to split the network packets into at least one header portion and at least one data (payload) portion while the Packet DMA Unit (116), DMA transfers the packet segments into their respective memory zones in the memory (130). The CHM Header Data Splitter (114) is configured to split the packet fields into a header portion and a data portion, as specified by offset from the start of the packet and length of the segment enabled in the system (100). Subsequently, a flow entry is looked up in the table. If an entry exists, the packet is split into two segments and DMA copied to header and payload memory buffer (mbuf) rings associated with the descriptor memory pool. Otherwise packet is DMA copied into regular memory pools of the memory (130). The packets after mapping of the header and payload portion are then transmitted by the system (100). In an embodiment, the packets received as a split entity of two linked segments, are processed by the NIC (110), akin to a chained mbuf, and are transmitted using a scatter-gather Input/Output (I/O) within the NIC (110) to avoid the overhead of serializing into a single buffer. Normal packets that are received by the traditional path can be can be transmitted without scatter/gather I/O in the non CHM mode i.e. when CHM in the system is not enabled.

Figure 2:
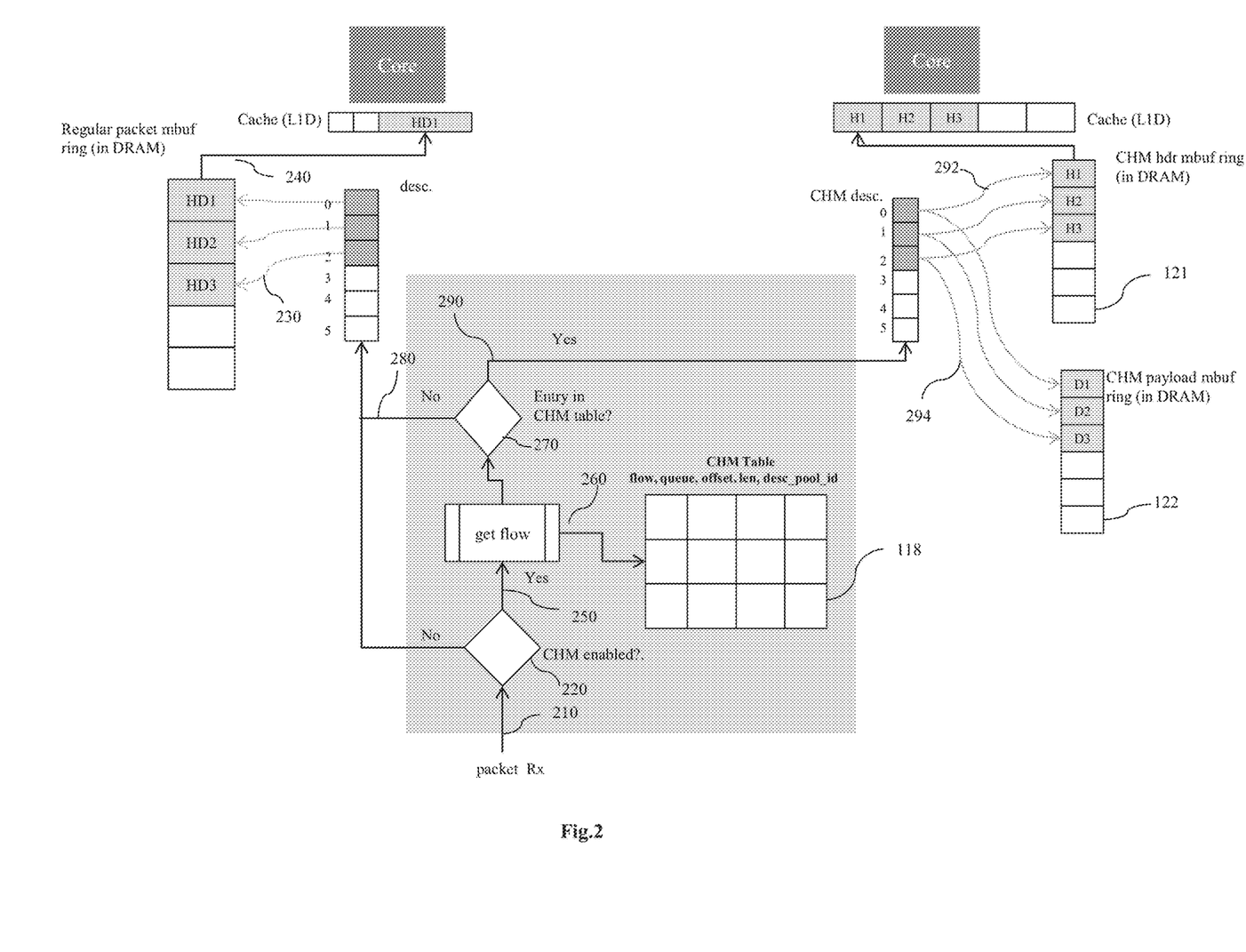
FIG. 2 illustrates a flow chart for a method for processing network packets according to an example embodiment.

FIG. 2 illustrates a flow chart for the various steps involved in a method (200) for receiving, processing and transmitting data packets according to an example embodiment. As the NIC (110) receives a packet (packet $R_x$) [step 210], the processor (112) of NIC (110) firstly determines if the NIC (110) is CHM enabled i.e. if the network packets are required to be contiguously mapped to different memory zones [step 220]. If the NIC (110) is not CHM enabled, then the network packets are mapped by the traditional process i.e. by DMA copying the entire packet including the header and payload [step 230], without splitting, into the buffer obtained from Rx ring descriptor [step 240].

If, in [step 220], it is found that the NIC (110) is CHM enabled, then the processor (112) of NIC (110), in [step 250], determines the flow of said network packet by hashing the packet fields of the network packets. The flow of the network packets is determined based on a set of parameters. The set of parameters including values of NIC queue, offset, length, descriptor pool identifier and the like. Each flow of the packet as identified by the NIC (110) is mapped to a NIC queue and a descriptor pool as a table entry of the CHM table (118), with flow as the lookup key [step 260]. If the flow determined by the processor (112) matches a CHM table entry [step 290], the specified packet segments associated with the packets are DMA copied by the CHM capable network interface controller (110), into header mbuf ring (121) [step 292] and the rest of the packet is mapped to payload mbuf ring (122) [step 294]. The header and payload elements are interlinked giving an illusion of a virtually contiguous memory segment. The header mbuf rings (121) are directly manipulated by the processor (112) (e.g. Internet Protocol routing) to take decisions. The contiguous nature of the headers (that are much smaller than the entire packet) and regularity of strides of header access, more number of headers are packed into Layer 1 Data Cache (L1D Cache) due to automatic hardware prefetching. In an example embodiment, the spatial locality of packet headers reduces prefetch instruction overhead by block prefetching and leverages hardware prefetches. The NIC (110) thus allows packing maximum number of packet headers for a given cache size within the hierarchy of caches.

If, after checking for an entry in the CHM configuration table (118) in [step 270], the flow does not match a CHM table entry [step 280], the packets are mapped by the traditional process i.e. by DMA copying the entire packet including the header and payload [step 230], without splitting, into the buffer obtained from Rx ring descriptor [step 240].

The packet segments as mapped by the processor (112) in [step 240] and [step 294] are stored in the memory (130), which may be further prefetched by the cache memory (113) of system (100).

Figure 3:
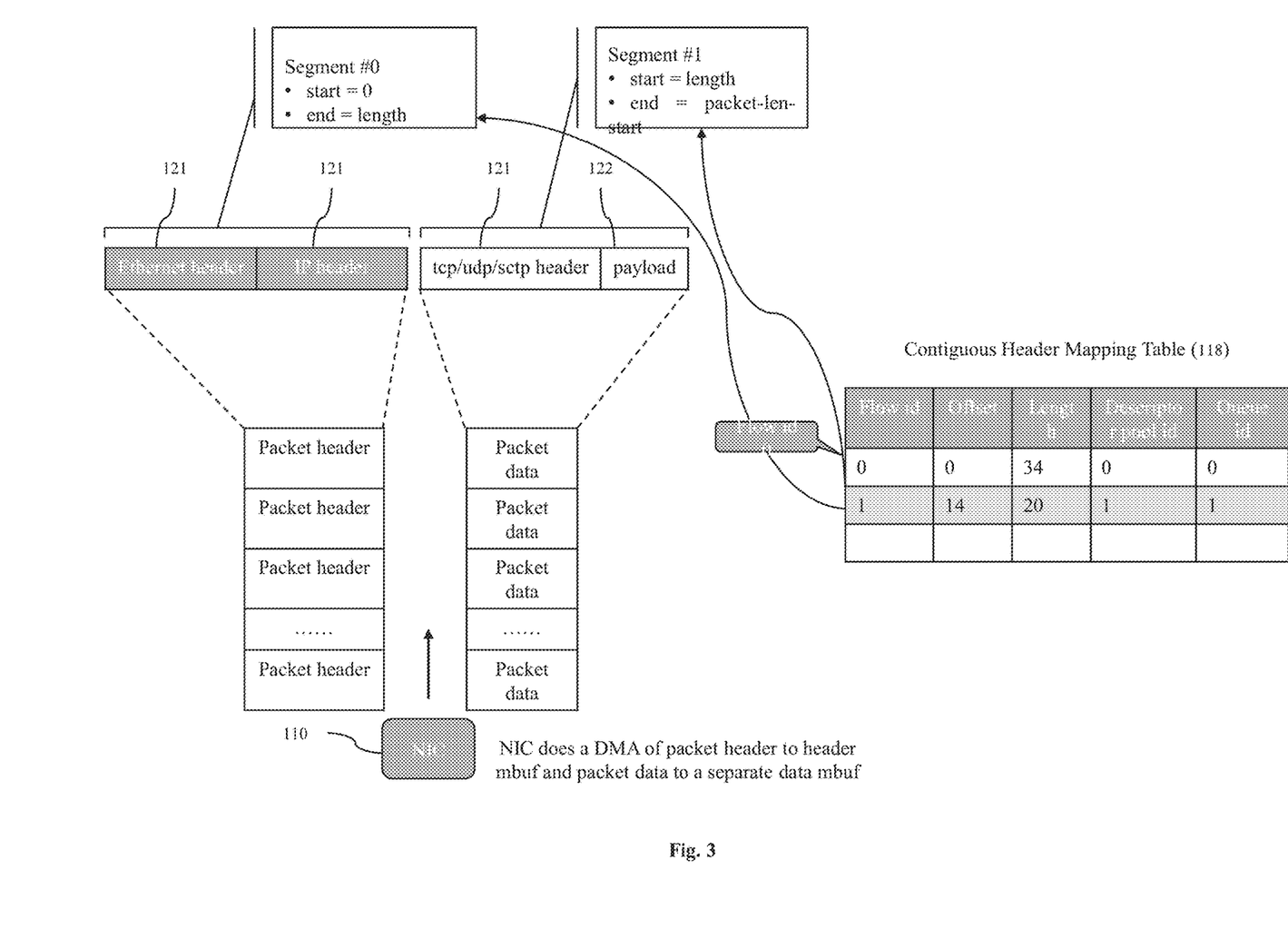
FIG. 3 illustrates an example of mapping of the flow and processing of packets, when the header offset is zero.
Figure 4:
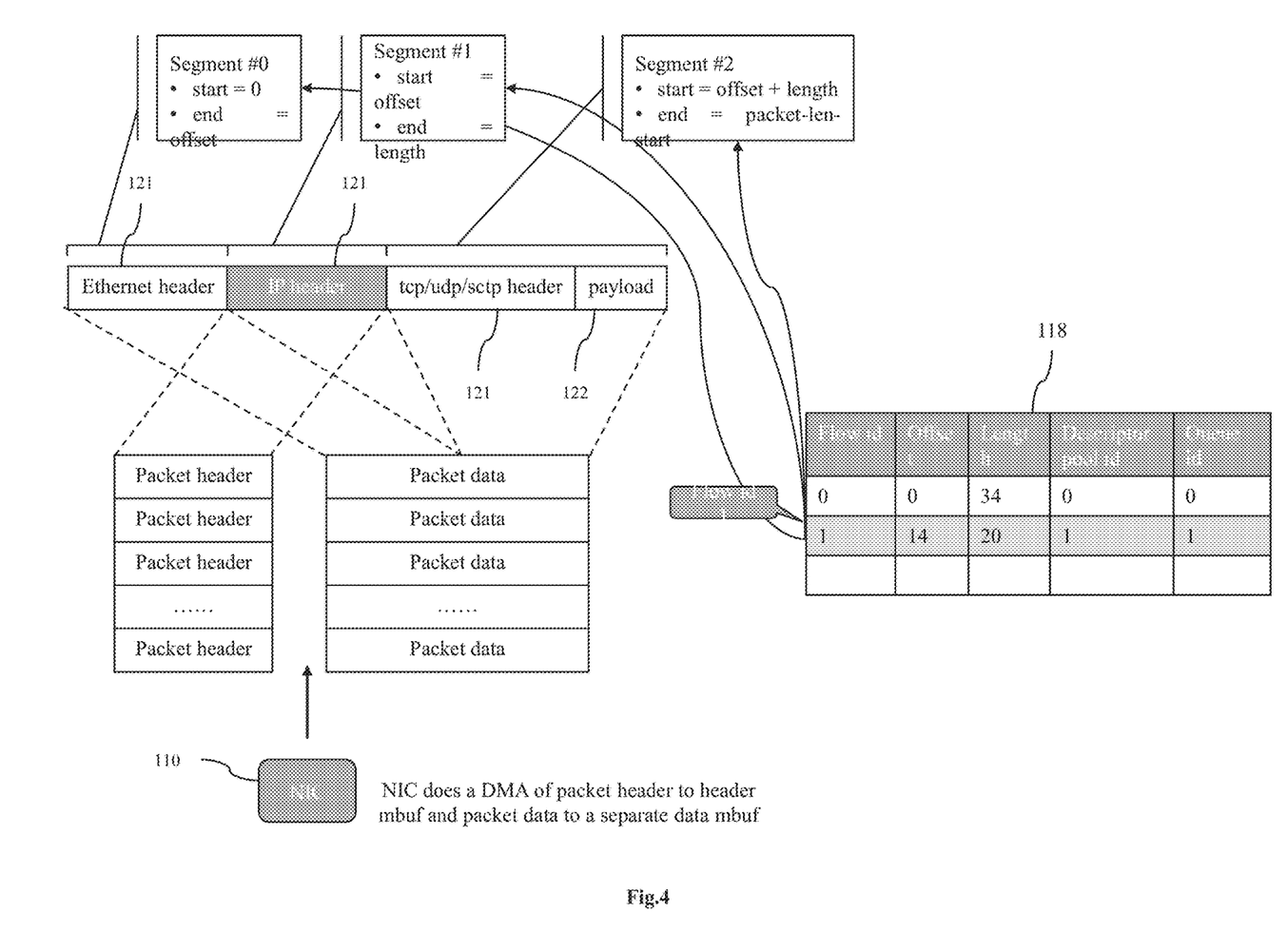
FIG. 4 illustrates an example of mapping of the flow and processing of packets, when the header offset is non-zero.

FIG. 3 and FIG. 4 illustrate examples for mapping of the flow and processing of packets using the processor (112) and method as described in the above exemplary embodiments. In the example, the flow defined by the NIC (110) has two memory segments: segment #0 of length from the beginning of the packet containing Ethernet header and IP header, and segment #1 which is the rest of the packet containing IP headers such as tcp/udp/sctp header and the payload, as shown in FIG. 3. The NIC (110) using the packet DMA unit (116), DMA copies segment #0 to the header mbuf ring (121) and the rest of the packet to the payload mbuf ring (122), for each packet that matches flow 0. If offset is non-zero, then the packet is divided into three segments as shown in FIG. 4: segment #1 is DMA copied by the DMA unit (116) to the header mbuf ring (121) and segment #0 and #2 together are DMA copied into payload mbuf ring (122).

In an exemplary embodiment, the NIC (110) used in system (100) as discussed herein may be a basic and intelligent NICs configured with Receive Side Scaling (RSS) to implement the method as described in the above exemplary embodiment. The Receive Side Scaling enables the NIC (110) to define the flow descriptor of the network packets as a hash function based on a set of tuples of packet fields.

Figure 5:
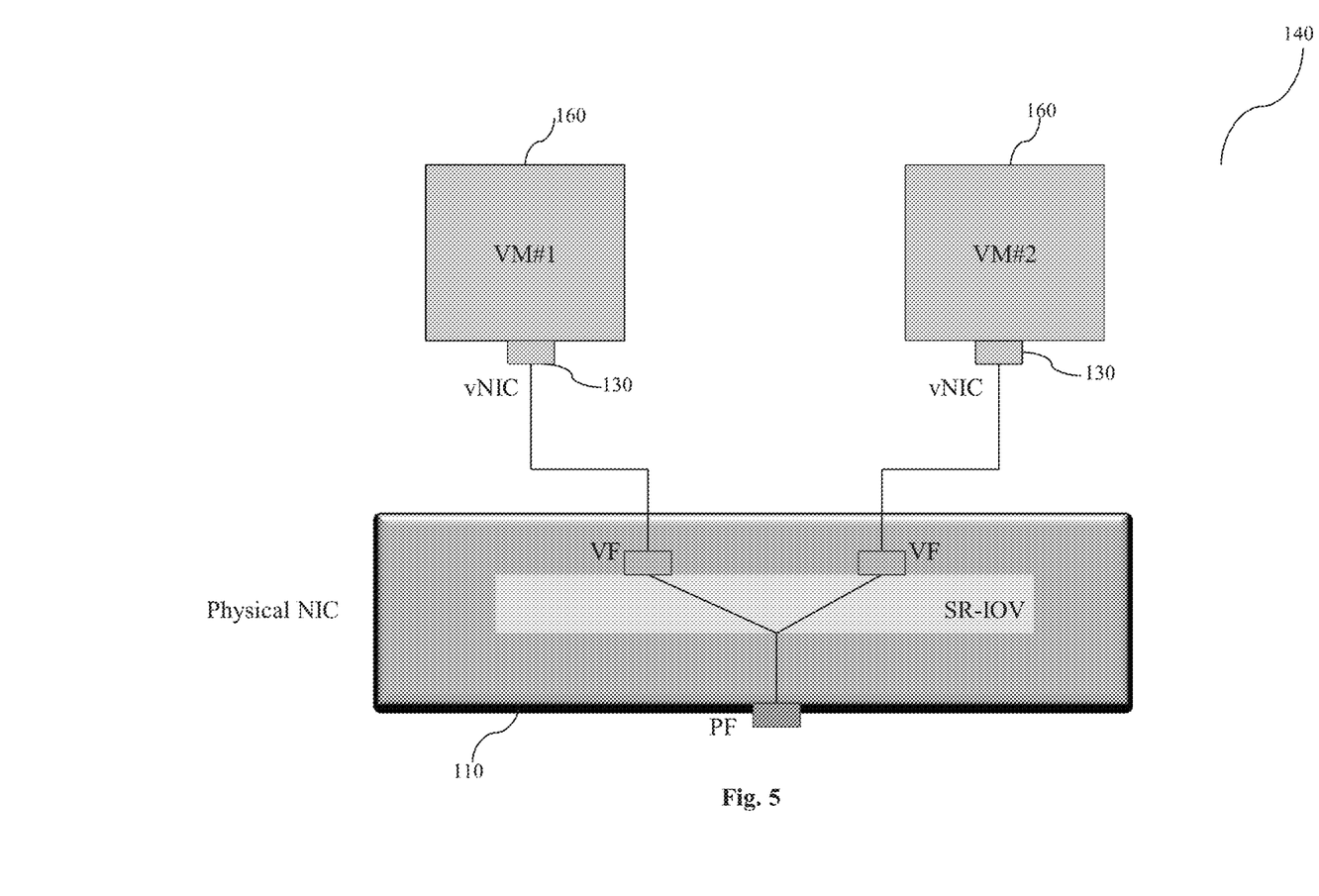
FIG. 5 illustrates a Virtual Machine (VM) deployment with a virtual NIC and physical NIC using a Single Root Input Output Virtualization (SR-IOV) support for processing network packets according to an example embodiment.

In another exemplary embodiment, the NIC (110) may also be a NIC configured with Single Root Input Output Virtualization (SR-IOV). In such a configuration, as also shown in FIG. 5, the system (100) acts as a Virtual Machine (VM) deployment (140) which uses a virtual NIC (v-NIC) (130) through a Virtual Function (VF) mapped to the physical function (PF) NIC (110) that supports SR-IOV. The VFs get only those specific Ethernet packets that are destined to them through an internal switching function. The system (100) according to an exemplary embodiment may be used to augment SR-IOV standard (internal switching) in the virtual machine (VM) deployment (140) in two ways:

a. Configured per VF: Each VF gets header—data split packets, which may be directly copied to the VM (140) using the VF table.

b. Configured per flow within each VF: Each VF gets the relevant header-data split for the flows that is configured per VF.

Figure 6:
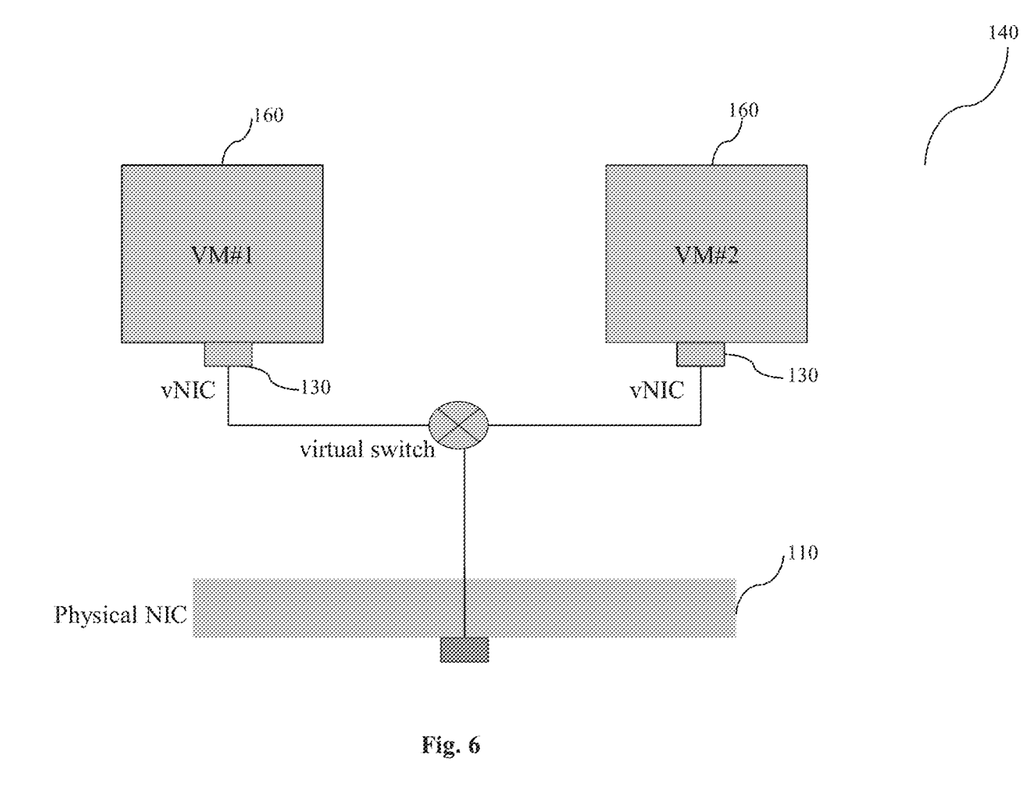
FIG. 6 illustrates a VM with a virtual switch for processing network packets, when the NIC does not support SR-IOV according to an example embodiment.

In another exemplary embodiment, the system (100) is a VM model (140) which uses a virtual switch (150) (typically implemented in software like Open Virtual Switch (OVS)) to provide virtual NICs (v-NICs) (130) for physical NICs (110) that do not support SR-IOV, as illustrated in FIG. 6. Typically, each VM (160) may host a Virtual Network Function (VNF). The virtual switch (150) may be programmed (like a SDN aware device) to provide a two stage processing;

Stage 1: The virtual switch describes its contiguous header map (CHM) to the NIC (110); and
Stage 2: Each VM (160) (hosting the VNF) describes the required CHM to the virtual switch.

In stage 1, only relevant packets with configured header-data split are copied into the switch memory of the virtual switch (150) by the processor (112). In stage 2, the data copy done by processor (112) may be optimized by copying static data based on Network Function Virtualization (NFV) role as a terminal or by a non-terminal VNFs: A terminal VNF is one where the entire packet (header and data) needs to be processed and no splitting of the packets is required. Non-terminal VNFs often require only specific headers for processing decisions. An example would be a chain of VNFs acting as a pipeline. In an aspect, where each VM (160) acts as a stage in a pipeline, working on the same set of fields, it is possible to have inter-VM messaging using only packet headers, since the data part (which is common across VMs) would already have been copied and can be trivially referenced. For a non-terminal VNF, splitting of the packets may be required and the packet processing system may be configured to copy only headers (required fields) of the packet from switch to VM (160). It is also possible to switch the packets out to another VNF (outside this cluster) without any packet copy at all.

In another exemplary embodiment, the data copy can be optimized by on-demand triggering of data copy or reconfiguration of data based on VNF request. In the embodiment, the VNF can demand to look inside data part after due inspection of the headers for those packets that satisfy a certain criterion. Such an on-demand copy may be implemented as a DMA copy request (requiring hardware intervention), a v-host-user protocol extension or similar request (between a hyper-visor and the VM) or through a plain memory copy. The protocol may also be used to dynamically renegotiate the configuration of the system itself to decide what to copy into the VM (160), based on its current functional status and configuration.

Thus, the system (100), processor (112) and method (200) for processing data packets, as discussed in the above exemplary embodiments, may be applicable to virtual machine (160) irrespective of whether they use a SR-IOV capable network interface controller (110) or a virtual switch (150) (both use cases). The packets split by the packet processing system (110), destined for the virtual machine (160) may be batched by the system into a single descriptor and thereby reduce interrupts delivered to every virtual machine (160) for packet arrival (which in turn is handled either by the operating system or by a corresponding fast path polled mode application).

Various modifications to these embodiments are apparent to those skilled in the art from the description and drawings herein. The principles associated with the various embodiment defined herein may be applied to other embodiments. Therefore, the description is not intended to be limited to the embodiments shown along with the accompanying drawings but is to be provided broadest scope consistent with the principles and novel and inventive features describe/disclosed or suggested herein. Any modifications, equivalent substitutions, improvements etc. within the spirit and principle of the subject matter described above shall all be included in the scope of protection of the present invention.

The invention claimed is:

1. An apparatus, comprising:
at least one processor; and
at least one memory storing instructions that, when executed by the at least one processor, cause the apparatus to:
receive a packet of a flow, wherein the packet includes a header and a payload, wherein the header includes a set of header fields;
identify, based on the flow, control information configured to control splitting of the packet of the flow;
split the packet into a first portion and a second portion based on the control information, wherein the first portion includes one or more header fields of the set of header fields, wherein the control information is configured to identify a location of the one or more header fields within the header, wherein the second portion includes the payload; and store the first portion in a first memory location and the second portion in a second memory location separate from the first memory location, wherein the first portion is stored contiguously with header data of a second packet.

2. The apparatus of claim 1, wherein the one or more header fields includes a set of multiple contiguous header fields of the set of header fields.

3. The apparatus of claim 1, wherein the control information comprises an offset from a beginning of the packet and a length of the first portion.

4. The apparatus of claim 1, wherein the second portion includes any of the header fields of the header excluded from the first portion.

5. The apparatus of claim 1, wherein the packet is split based on a determination that a packet splitting service is to be used for the packet.

6. The apparatus of claim 5, wherein the determination that the packet splitting service is to be used for the packet is based on the flow of the packet.

7. The apparatus of claim 1, wherein the control information is maintained in an entry of a table for the flow.

8. The apparatus of claim 7, wherein the packet is split based on identification of the entry of the table for the flow.

9. The apparatus of claim 7, wherein the table is configured to be manipulated by an application.

10. The apparatus of claim 1, wherein, to store the first portion in the first memory location, the instructions, when executed by the at least one processor, cause the apparatus to:

store the first portion in the first memory location using a direct memory access (DMA) copy operation.

11. The apparatus of claim 1, wherein the first memory location comprises a header buffer configured to provide contiguous storage of header data for packets.

12. The apparatus of claim 11, wherein the instructions, when executed by the at least one processor, cause the apparatus to:

support direct manipulation of the header buffer by a packet processing application for making a packet processing decision for the packet.

13. The apparatus of claim 1, wherein, to store the second portion in the second memory location, the instructions, when executed by the at least one processor, cause the apparatus to:

store the second portion in the second memory location using a direct memory access (DMA) copy operation.

14. The apparatus of claim 1, wherein the instructions, when executed by the at least one processor, cause the apparatus to:

store, for the packet, a descriptor including a pointer to the first memory location and a pointer to the second memory location.

15. The apparatus of claim 14, wherein the first portion and the second portion are linked by the descriptor.

16. The apparatus of claim 1, wherein the instructions, when executed by the at least one processor, cause the apparatus to:

prefetch, into a cache line of a cache, the first portion and the header data of the second packet.

17. The apparatus of claim 1, wherein the apparatus comprises a network interface card configured for use within a packet node.

18. A non-transitory computer-readable medium storing computer program code configured to cause an apparatus to:

receive a packet of a flow, wherein the packet includes a header and a payload, wherein the header includes a set of header fields;

identify, based on the flow, control information configured to control splitting of the packet of the flow;

split the packet into a first portion and a second portion based on the control information, wherein the first portion includes one or more header fields of the set of header fields, wherein the control information is configured to identify a location of the one or more header fields within the header, wherein the second portion includes the payload; and store the first portion in a first memory location and the second portion in a second memory location separate from the first memory location, wherein the first portion is stored contiguously with header data of a second packet.

19. A method, comprising:

receiving a packet of a flow, wherein the packet includes a header and a payload, wherein the header includes a set of header fields;

identifying, based on the flow, control information configured to control splitting of the packet of the flow;

splitting the packet into a first portion and a second portion based on the control information, wherein the first portion includes one or more header fields of the set of header fields, wherein the control information is configured to identify a location of the one or more header fields within the header, wherein the second portion includes the payload; and storing the first portion in a first memory location and the second portion in a second memory location separate from the first memory location, wherein the first portion is stored contiguously with header data of a second packet.

* * * * *